UNITED STATES PATENT OFFICE.

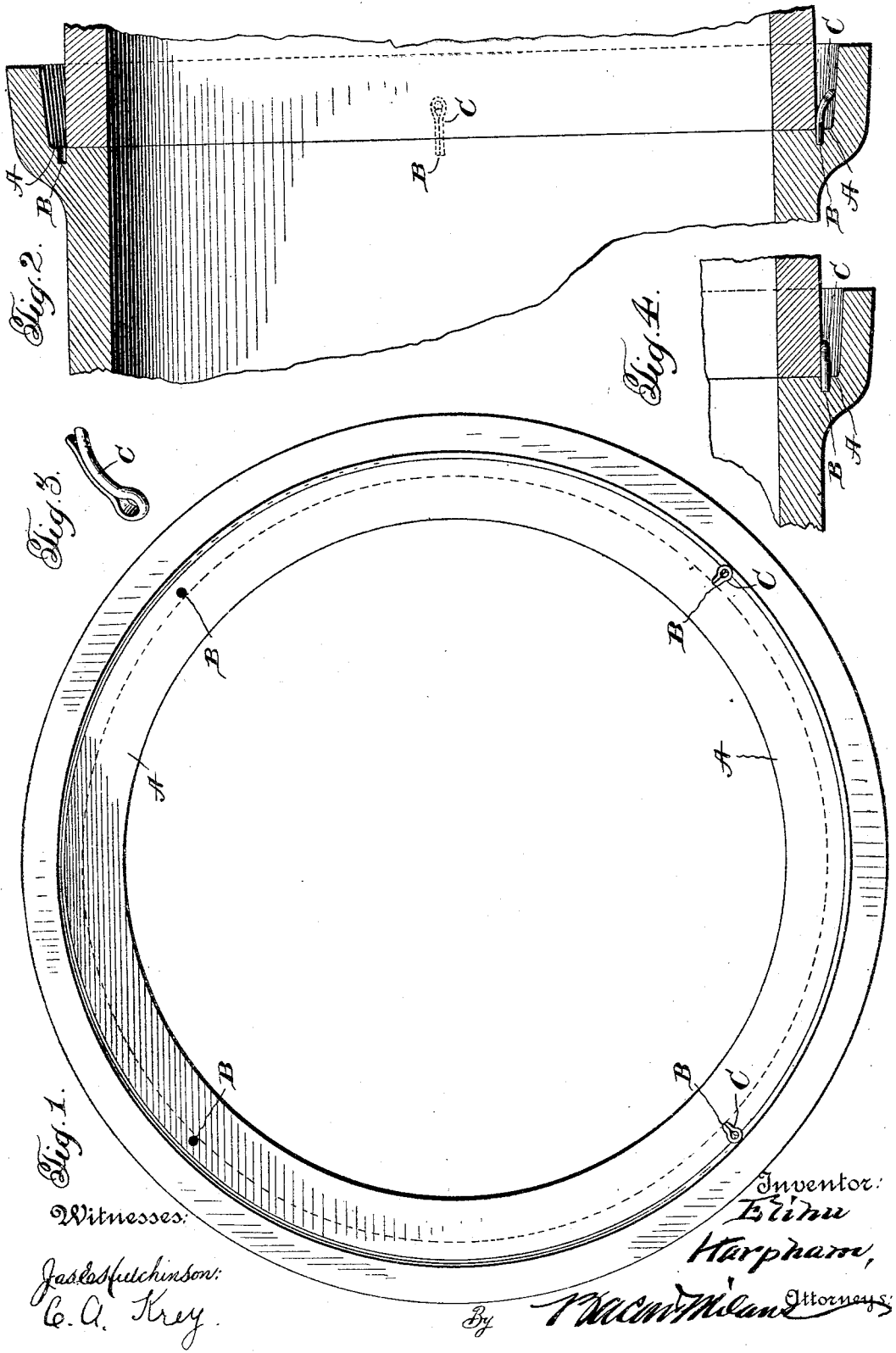

ELIHU HARPHAM, OF AKRON, OHIO.

DRAIN OR SIMILAR PIPE.

No. 929,941.  Specification of Letters Patent.  Patented Aug. 3, 1909.

Application filed March 8, 1909. Serial No. 481,978.

*To all whom it may concern:*

Be it known that I, ELIHU HARPHAM, a citizen of the United States, residing at Akron, in the county of Summit and State of Ohio, have invented certain new and useful Improvements in Drain or Similar Pipes, of which the following is a specification, reference being had therein to the accompanying drawing.
This invention relates to an improvement in drain or similar pipes, especially such as are made of earthen ware, and it consists generally in an improved construction of such pipes whereby centering devices of a removable character may be employed and adjusted, and when adjusted retained in such adjusted position.

The invention also consists in the combination of a pipe section of a centering device, conveniently of the self-centering type, so arranged and constructed that it may be placed and secured in proper position for service.

Heretofore, in this art it has been suggested to form on the inner wall of the socket member a series of integral projections serving as self-centering means for properly positioning the spigot end in the socket end of an adjacent pipe. It has, however, been found in such structures that it was always necessary to invariably adjust the pipe so that said integral centering projections would be at the bottom, and so irrespective of the condition of the end of the pipe sections.
It is well known that in forming drain pipe sections, it is quite impossible to have the same always of the exact shape and contour, warping often occurring during the manufacture. This has rendered in the past sections of pipes having fixed centering devices useless in many instances, especially where exact work is required. It has also been suggested to place a removable centering device in the socket end of a pipe, shaping the device to fit the contour of the inner face of the socket and outer surface of the spigot end of the companion pipe. Such devices, however, have been found expensive and are very apt to be misplaced in adjusting the pipe sections.

My invention has for its object the production of a removable or detachable centering device of comparatively small dimensions and to so fashion the pipe sections that such removable or detachable device can be readily placed in position and there retained.

A further object is the provision of a structure, as above indicated, which can be applied at different points throughout the interior of the socket end of the pipe section, and when adjusted to such positions will serve as a centering means for the flow line of the pipes.

In addition to the above stated objects, one of the purposes of the invention is to provide a centering device which can be attached to the pipe section in a manner to prevent displacement and which will serve as a self-centering device.

In the accompanying drawing, I have shown an embodiment of the invention, but it is to be understood that while the construction shown is one of manifest utility and possesses many advantages, yet the invention is not limited to the particular arrangement and construction shown, and in this particular I desire it understood that many changes can be made without departing from the spirit and nature of the invention.

In the drawing, Figure 1 is an end view of the socket member showing the arrangement of the seats and depressions. Fig. 2 represents in longitudinal section the adjacent ends of two pipe sections, one being the socket end and the interfitting part the spigot end, which terms are generally understood in this art, Fig. 3 is a perspective view of one of the centering pins, and Fig. 4 is a sectional view of a portion of the meeting ends of adjacent pipe sections showing a modified form of centering pin.

While the material is in a semi-plastic state susceptible of being indented, I form in the base portion A of the socket part of the pipe section, a series of depressions or seats B. These are conveniently of cylindrical formation and extend well into the material longitudinally of the pipe section and at a point slightly beyond the outer plane of the outer surface of the pipe, that is to say, the pipe sections being usually of uniform thickness of wall, I place these seats or depressions in the socket part at a point where their inner walls will be practically in line with the outer surfaces of the pipes. These seats or depressions are conveniently arranged at equi-distant points in the socket and in that particular I have shown four of such seats. It is, however, to be understood that any number of seats or depressions may be employed, but by preference the number should be such that any two of the series may be employed for the receiving centering means or rest for the spigot end of the adjacent pipe. This arrangement of a plurality of seats or depressions on any one or more of which centering devices may be placed, is important, in that pipes of the character to which this invention is applied are frequently found to be irregular or uneven, and therefore require adjusting or turning, to place the straight flow surface at the bottom.

Removably inserted in the lowermost seats or depressions B are centering pins C, which pins are of a size to readily fit the seats and to be therein held. These pins are conveniently of what is known as the "split" type, having their ends slightly sprung apart, somewhat similar to the ordinary split key, by which means they are permitted to be inserted in the seats or depressions and there frictionally held in place. They have their outer ends conveniently dropped or bent at an incline to form inclined surfaces onto which and up which the spigot end of the adjacent pipe engages and moves in the act of placement, in which connection, as soon as the spigot end is properly positioned, it will rest on one or more of the centering pins and there remain ready for the reception of the usual cement employed in completing such joints. By the employment of pins, as self-centering devices, or their equivalents, I am enabled to center the pipe sections properly and so without occupying unnecessary space within the socket, so that the cement can be readily applied throughout the entire circumference of the spigot end of the pipe, in the socket without obstruction and without danger of leaving gaps or openings through which the liquid may escape.

In operation, the workman places the pipe section in position after adjusting the same properly to secure the most accurate and straight flow surface, he then places in the lowermost seats or depressions the centering pins which are there held in position and prevented from accidental displacement. If it should be necessary at this time to apply small portions of cement, this can be done and still the pins will remain undisturbed as to position. The spigot end of the pipe is now inserted in the socket, the end thereof engaging the inclined pins will move upward into position ready for permanent connection and setting by the cement usually employed for such purposes.

In Fig. 4, the centering pin is a straight variety, that is to say, it is a straight pin onto which the end of the adjacent pipe may be placed and held for cementing. Other forms of pins can be employed.

I believe I am the first to form a pipe section of the character described wherein the centering device can be attached to the pipe, as distinguished from being made a permanent part or integral therewith, and also as distinguished from that class wherein a supporting block or member is used without being secured in position.

It will be noted that in forming the seats or depressions for the centering means, the pipe, as such, is in no wise weakened and the seats can be made very readily in any convenient manner during the method of forming the pipe section in a usual machine, all that is required being the attachment to the follower or supporting board outwardly extending pins or lugs, which will enter the pipe material, thus forming the seats.

While I have used the term "seat or depression" as defining that part for receiving the pin, I wish it understood that the term is employed without restriction and intended to define generally any means which will coöperate with the centering device for retaining it in its adjusted position.

Having thus described the invention, what is claimed as new and desired to be secured by Letters Patent is:

1. In a device of the character described, a pipe section having a socket portion and a plurality of seats for receiving and retaining in position centering devices.

2. A pipe section having a socket portion formed with a plurality of seats for receiving centering devices, said seats being arranged equi-distance apart.

3. A pipe section having a socket end formed with a retaining seat for a centering device.

4. A pipe section having a socket portion formed with a series of longitudinally extending depressions formed to receive pipe centering devices.

5. A pipe section having a socketed end, a detachable centering device located within the socket, and means whereby the centering device can be placed and secured in position within the socket.

6. A pipe section having a socketed end and a plurality of centering pins inserted in the socket end adjacent the plane of the outer surface of the pipe.

7. In a pipe section having a socket end, a detachable self-centering device and means for securing the same in its adjusted position in the socket.

8. In a pipe section having a socketed end, a self-centering pin having a curved outer end, and means for securing the pin in place.

9. In a pipe section, a socketed end having a seat therein, and a self-centering device having a yielding portion located in the said seat.

In testimony whereof I affix my signature in presence of two witnesses.

ELIHU HARPHAM.

Witnesses:
 W. R. IRVIN,
 C. F. SCHNEE.